United States Patent
Hiraoka

(10) Patent No.: US 7,443,441 B2
(45) Date of Patent: Oct. 28, 2008

(54) LENS APPARATUS AND IMAGE-TAKING SYSTEM WITH MULTIPLE FOCUS MODES

(75) Inventor: Akira Hiraoka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/027,374

(22) Filed: Dec. 30, 2004

(65) Prior Publication Data

US 2005/0146635 A1    Jul. 7, 2005

(30) Foreign Application Priority Data

Jan. 5, 2004    (JP) .............................. 2004-000604

(51) Int. Cl.
*H04N 5/232*    (2006.01)
(52) U.S. Cl. .................................... 348/345
(58) Field of Classification Search ......... 348/345–356; 396/89, 131
See application file for complete search history.

(56) References Cited

U.S. PATENT DOCUMENTS

| | | | |
|---|---|---|---|
| 5,052,781 A | 10/1991 | Iizuka | |
| 5,075,713 A * | 12/1991 | Sakata | ........................ 396/80 |
| 5,572,373 A | 11/1996 | Imanari et al. | |
| 5,918,078 A | 6/1999 | Imura et al. | |

FOREIGN PATENT DOCUMENTS

| | | |
|---|---|---|
| EP | 0439219 | 7/1991 |
| EP | 0439219 A2 | 7/1991 |
| JP | 2003-337278 | 11/2003 |
| JP | 2003-344750 | 12/2003 |

OTHER PUBLICATIONS

A Communication from the European Patent Office issued on Feb. 6, 2006 for Appl. No. 05 250 007.1-2217.
A Communication (European Searh Report) from the European Patent Office issued on Apr. 22, 2005 for Appl. No. 05 250 007.1-2217 (4 pages).

* cited by examiner

*Primary Examiner*—Lin Ye
*Assistant Examiner*—Anthony J Daniels
(74) *Attorney, Agent, or Firm*—Morgan & Finnegan, LLP

(57) ABSTRACT

A lens apparatus is disclosed, in which the MF operation can be performed at any time during the AF operation. The lens apparatus comprises a lens system including a front focusing lens, a magnification-varying lens and a rear focusing lens, a first operating member, and a second operating member. The front focusing lens is driven for manual focus in accordance with the operation of the first operating member in the first mode, the rear focusing lens is driven for automatic focus in the second mode. The focus mode is switched from the second mode to the third mode in accordance with the operation of the second operating member. The rear focusing lens is driven in accordance with the operation of the second operating member in the third mode.

2 Claims, 4 Drawing Sheets

LENS APPARATUS AND IMAGE-TAKING SYSTEM WITH MULTIPLE FOCUS MODES

FIELD OF THE INVENTION

The present invention relates to a lens apparatus used for an image-taking system, especially a lens apparatus used for a television camera system and video camera system equipped with automatic focus and manual focus.

Conventionally, so-called hybrid focus-type lens apparatuses are known as lens apparatuses equipped with an automatic focus function and used with cameras such as television cameras or video cameras, which are disclosed in Japanese Laid-Open Patent Application No. 2003-344750, for example.

In the hybrid focus-type lens apparatus, a rear focusing lens for automatic focus (hereafter, it is referred to as AF) is driven in AF mode, a front focusing lens for manual focus (hereafter, it is referred to as MF) is driven in MF mode.

As shown in FIG. 4, the hybrid focus-type lens apparatus is equipped with a rear focusing lens unit 106 for AF and a front focusing lens unit 104 for MF, and is used for image-taking in two focus modes, which are AF mode and MF mode, that are properly switched by the user via a mode selection switch 102.

The manual focus operation is performed by driving the front focusing lens unit 104 in the direction of an optical axis by operating an operating member 107 mechanically connected with the front focusing lens unit 104 in a state in which the rear focusing lens unit 106 is fixed at its reference position.

The automatic focus operation is performed by driving the rear focusing lens unit 106 to an appropriate position in the direction of the optical axis with an actuator 108, which is controlled by a command signal from a controller 119, in a state in which the front focusing lens unit 104 is fixed at its reference position.

Moreover, an image-taking apparatus in which the MF operation is permitted at any time during AF mode is disclosed in Japanese Laid-Open Patent Application No. 2003-337278. However, this lens apparatus is not the hybrid focus-type lens apparatus with the front focusing lens unit and rear focusing lens unit.

Furthermore, in the hybrid focus-type lens apparatus disclosed in Japanese Laid-Open Patent Application No. 2003-344750, the user cannot intentionally adjust the focus state from the outside of the apparatus since the front focusing lens unit and the operating member are fixed in the AF mode. Therefore, there is a problem that, for example, the AF functions on a front person in a focusing area though the user wants the AF to function on a back wall for camera effects.

BRIEF SUMMARY OF THE INVENTION

An object of the present invention is to provide a hybrid focus-type lens apparatus in which the MF operation for focus adjustment suitable for the user's intention can be performed at any time during the AF mode, and an image-taking system with the same.

One aspect of the present invention is a lens apparatus, which comprises a lens system including, in order from an object side, a front focusing lens, a magnification-varying lens and a rear focusing lens, a first operating member, and a second operating member. The lens apparatus has a first mode, a second mode and a third mode as focus modes. The front focusing lens is driven for manual focus in accordance with the operation of the first operating member in the first mode, the rear focusing lens is driven for automatic focus in the second mode. The focus mode is switched from the second mode to the third mode in accordance with the operation of the second operating member, and the rear focusing lens is driven in accordance with the operation of the second operating member in the third mode.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

Embodiment 1

Figure 1:
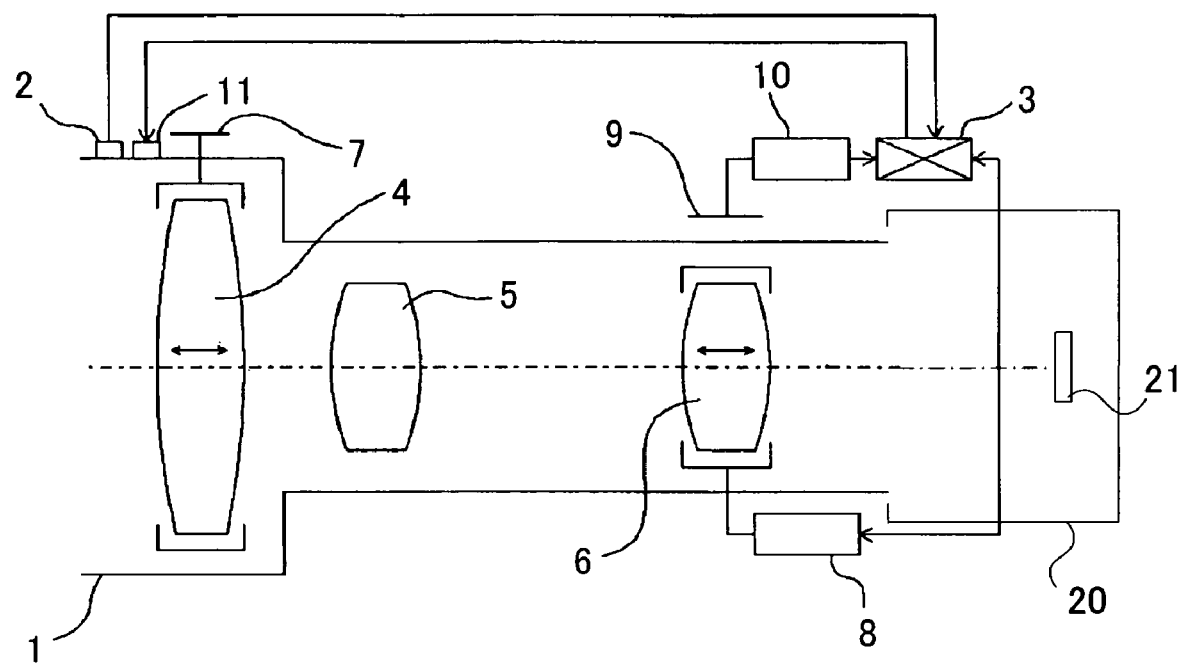
FIG. 1 is a view showing the structure of an image-taking system including a lens apparatus equipped with focusing lens units for AF and MF in Embodiment 1 of the present invention.

FIG. 1 shows the structure of a lens apparatus in Embodiment 1 of the present invention, which has focusing lens units for AF and MF.

In FIG. 1, the reference numeral 1 denotes the lens apparatus, the reference numeral 2 denotes a mode selection switch for selecting a focus mode, and the reference numeral 3 denotes a controller (control circuit). The mode selection switch 2 is installed at an optional position on the lens apparatus 1, and the focus mode is selected by user's operation of the mode selection switch 2. The content of the selection is transmitted to the controller 3.

In this embodiment, the focus mode can be selected from three modes, which are a manual focus (MF) mode as a first mode, an automatic focus (AF) mode and an AF assist mode. In the AF assist mode, the MF operation (MF sub-mode) can be performed at any time during the AF operation (AF sub-mode), and thereby the user can adjust the focus state intentionally. Herein, the AF sub-mode in the AF assist mode corresponds to a second mode, and the MF sub-mode in the AF assist mode corresponds to a third mode.

The lens apparatus 1 has a lens system as follows. In order from the object side (the left side in the figure), the reference numeral 4 denotes a front focusing lens unit driven in the MF mode, the reference numeral 5 denotes a magnification-varying lens unit for varying the magnification, and the reference numeral 6 denotes a rear focusing lens unit driven in the AF mode and AF sub-mode.

The reference numeral 7 denotes a MF operating member as a first operating member, and the reference numeral 8 denotes an actuator for driving the rear focusing lens unit 6.

The lens apparatus 1 is mounted on a camera 20. The camera 20 is an apparatus which includes at least an image-pickup device 21 such as a CCD sensor or CMOS sensor, and the lens apparatus 1 and the camera 20 constitute an image-taking system.

A luminous flux from the object, which is transmitted through the lens system, enters the camera 20. In the camera 20, the luminous flux is color-separated by a color separating optical system, not shown in the figure, and then forms an image on the image-pickup device 21. The image-pickup device 21 electrically converts the object image into video signals or television signals.

Here, when the camera 20 takes images, the front focusing lens unit 4 for MF, magnification-varying lens unit 5 including a variator lens or a compensator lens, and the rear focusing lens unit 6 for AF in the direction of the optical axis, respectively, in the lens apparatus 1.

The front focusing lens unit 4 is mechanically connected with the MF operating member 7, and the rear focusing lens unit 6 is mechanically connected with the actuator 8.

The reference numeral 9 denotes a second operating member, which is arranged at an optional position on the lens apparatus 1. When the user operates the second operating member 9 during the AF operation in the AF sub-mode, an operation detector 10 detects the operation and the operation amount of the second operating member 9 and then sends a detection signal to the controller 3.

Figure 3:
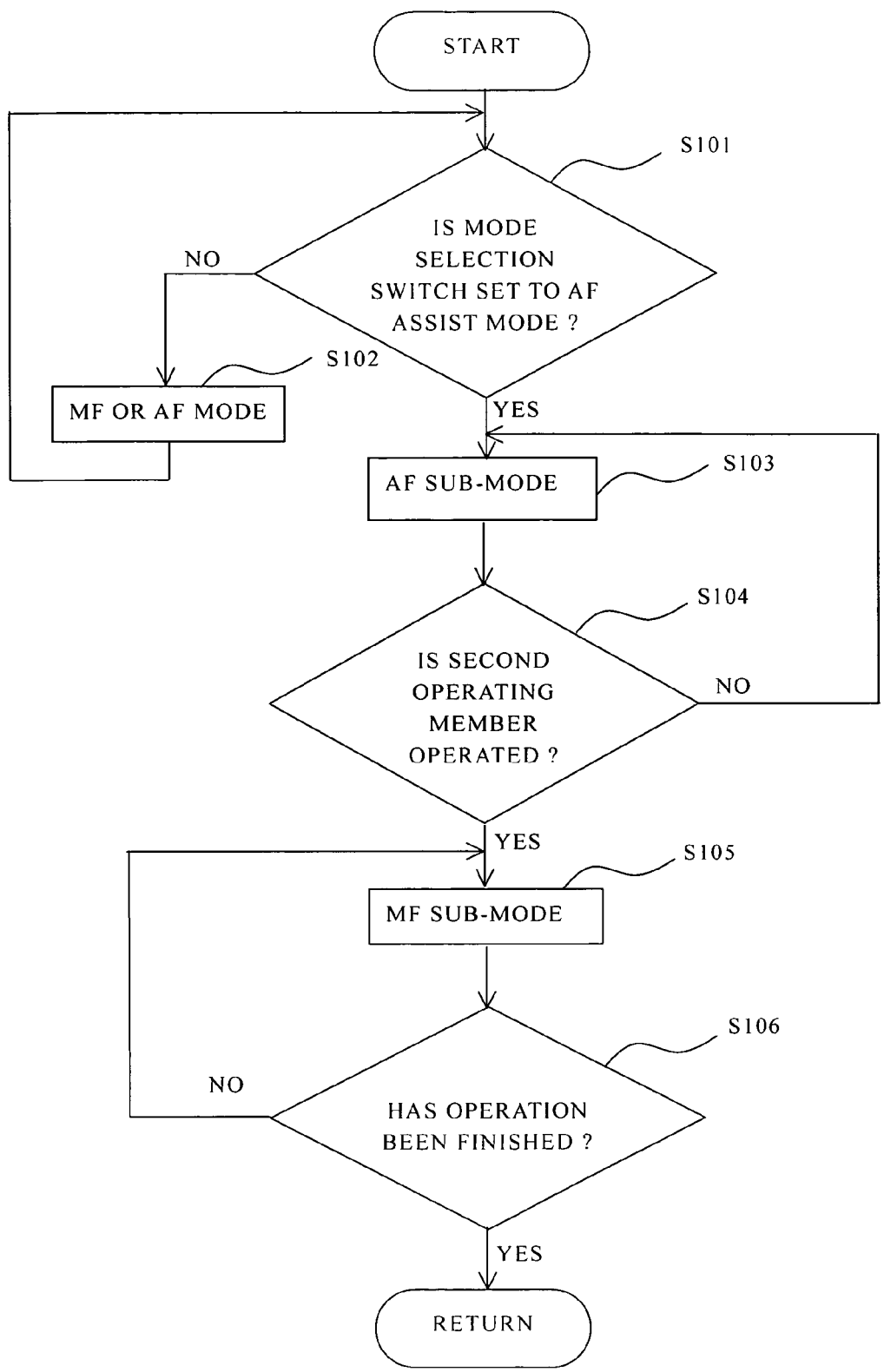
FIG. 3 is a flowchart showing processes in the lens apparatus in Embodiments 1 and 2.
Figure 4:
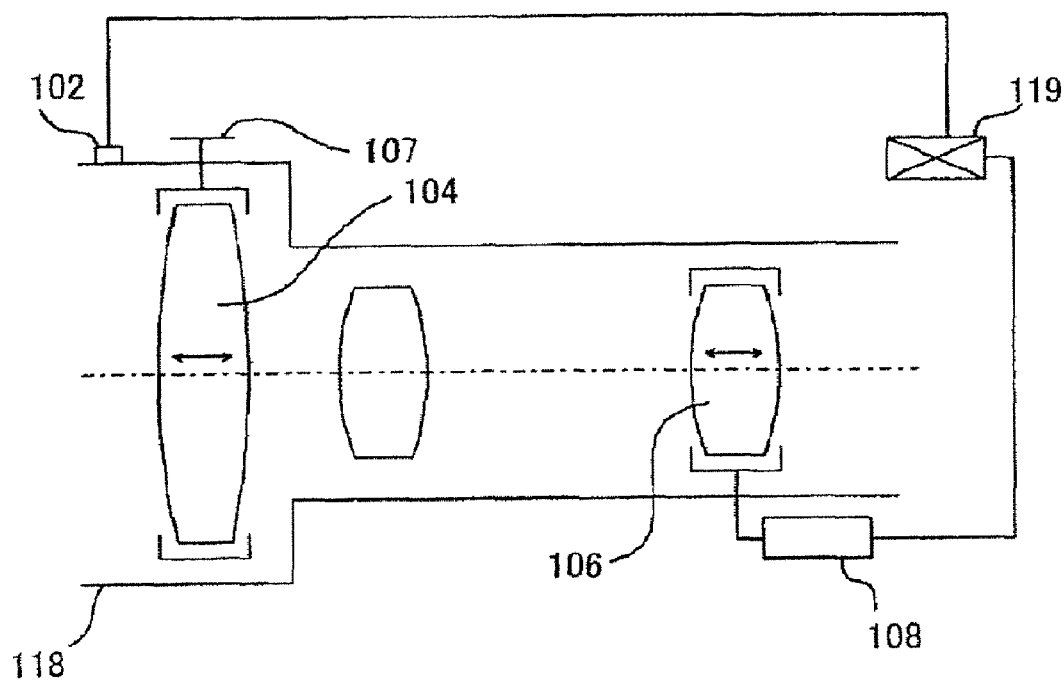
FIG. 4 is a view showing the structure of a conventional image-taking system equipped with focusing lens units for AF and MF.

Next, the processes of the lens apparatus in each mode will be explained by using FIG. 3.

First, the controller 3 judges whether the mode selection switch 2 is set to the AF assist mode or not (S101). If the mode selection switch 2 is set to the MF mode or the AF mode, the process progresses to S102.

In the MF mode that is the first mode, the front focusing lens unit 4 is driven in the direction of the optical axis by means of a screw mechanism or cam mechanism, etc. in accordance with the operation, such as a rotational operation, of the MF operating member 7 by the user. In this case, the rear focusing lens unit 6 is fixed (in an unmoved state) at a certain reference position.

In the AF mode, the front focusing lens unit 4 is fixed (in an unmoved state) at a certain reference position, and the controller 3 calculates the target position of the rear focusing lens unit 6, where the best focus will be obtained, based on the position information of the front focusing lens unit 4 and the video signal from the camera 20 with TV-AF method (Contrast Detection method), and then the controller 3 sends a drive command signal to the actuator 8 so that the rear focusing lens unit 6 is moved to the target position.

The position of the rear focusing lens unit 6 is detected with a position detector, not shown in the figure, and the detection signal is fed back to the controller 3. When the rear focusing lens unit 6 reaches the target position, the controller 3 outputs a stop command signal to stop the drive of the actuator 8, and thereby the drive of the rear focusing lens unit 6 is stopped.

It is preferable that the actuator is equipped with the position detector, but the position detector may be provided separately from the actuator. In this embodiment, the position detector is included in the actuator.

If the mode selection switch 2 is set to the AF assist mode (S101), the process progresses to S103. In the AF sub-mode of the AF assist mode, the controller 3 controls the drive of the rear focusing lens unit 6 with the actuator 8 after the front focusing lens unit 4 has been fixed to the reference position like the AF mode.

However, when the user operates the second operating member 9 during the AF operation in the AF sub-mode, the operation detector 10 detects the operation (the operation amount and direction) of the second operating member 9, and the detection signal is sent to the controller 3 (S104). Thereby, the focus mode is switched from the AF sub-mode to the MF sub-mode.

In the MF sub-mode, the controller 3 sends the stop command signal to discontinue the AF operation to the actuator 8, and at the same time, the controller 3 sends the drive command signal to drive the rear focusing lens unit 6 to the actuator 8 in accordance with the operation amount and direction of the second operating member 9 (S105).

Thereby, the rear focusing lens unit 6 is driven by the actuator 8 according to the drive command signal at the same time as discontinuing the AF operation. As a result, the rear focusing lens unit 6 is driven in the direction of the optical axis in accordance with the user's operation amount and direction of the second operating member 9, and thereby the focus adjustment from the outside of the lens apparatus 1 can be performed though it is during the AF operation.

And, when the operation detector 10 detects that the operation of the second operating member 9 has been finished, the controller 3 judges that the focus adjustment by the user has been finished (S106), and then restarts the AF operation from the rear focusing lens position at that time. In other words, the focus mode returns to the AF sub-mode.

The detection signal showing that the operation of the second operating member 9 has been finished is sent to the controller 3, and the controller 3 sends the drive command signal to the actuator 8 so that the rear focusing lens unit 6 is driven by the AF operation from that position at once.

A display 11, which displays the selection content of the mode selection switch 2, is installed in an optional position on the lens apparatus 1, and thereby the user can confirm the focus mode, which is currently selected, from the outside.

The method of the display may be a method in which the luminescence state of an illuminant is changed according to the focus mode, or a method in which the focus mode itself is displayed such as '1' or '2'.

Moreover, as the second operating member 9, members of various configurations, such as a ring without mechanism end, a knob type-dial, or a slide type-moving member of, can be used.

The operation of the second operating member 9 is effective only in the AF assist mode. In other words, any changes do not occur in the content of the focus operation in the MF mode and the AF mode even if the second operating member 9 is operated.

According to the present embodiment, providing the AF assist mode in the hybrid focus-type lens apparatus, which is equipped with the AM and MF functions, makes it possible for the user to perform the MF operation at any time during the AF operation with good following performance, and the degree of freedom of image-taking suitable for the user's intention can be further widened.

Here, in order to change the focus state during the AF operation, driving the rear focusing lens unit is preferable to driving the front focusing lens unit. The reason is as follows.

As described above, it is necessary to fix the front focusing lens unit at a reference position when performing the AF operation with the rear focusing lens unit. If the front focusing lens unit is moved during the AF operation and the reference position is changed, it becomes necessary to return the front focusing lens unit to the reference position at the time of the next AF operation. Since this is a time-consuming process, quick camera work is difficult to do, and therefore the degree of freedom of image-taking is reduced.

Moreover, in a case where it is intended that the AF operation at any position of the front focusing lens unit can be performed so that the above problem will not occur, since the driving amount of the rear focusing lens unit is changed in accordance with the position of the front focusing lens unit even if the object distance is not changed, it is necessary to determine the total length of the lens apparatus on the assumption that the driving amount of the rear focusing lens unit becomes largest. As a result, it becomes an obstruction of miniaturizing, lightening and shortening the apparatus, and the degree of freedom of image-taking is also reduced.

Embodiment 2

Figure 2:
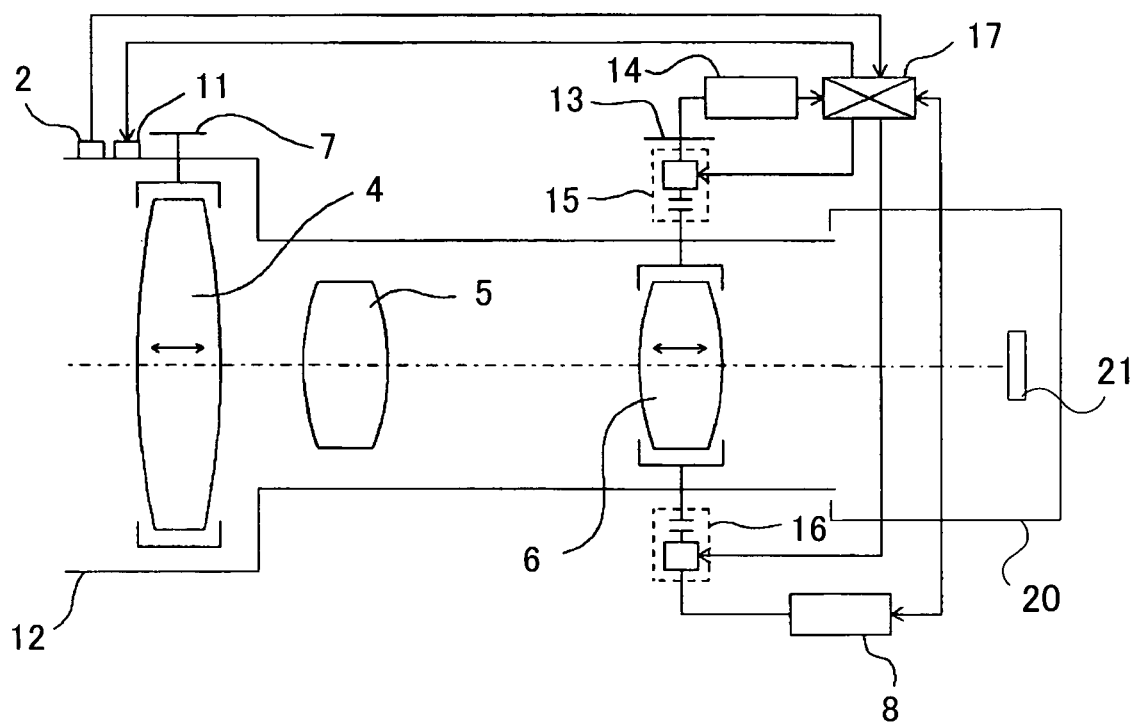
FIG. 2 is a view showing the structure of an image-taking system including a lens apparatus equipped with focusing lens units for AF and MF in Embodiment 2 of the present invention.

FIG. 2 shows the structure of a lens apparatus in Embodiment 2 of the present invention, which has focusing lens units for AF and MF.

In FIG. 2, the reference numeral 12 denotes the lens apparatus, the reference numeral 2 denotes a mode selection switch for selecting a focus mode, and the reference numeral 17 denotes a controller (control circuit). The mode selection switch 2 is installed at an optional position on the lens apparatus 1 as well as Embodiment 1, and the focus mode is selected by user's operation of the mode selection switch 2. The content of the selection is transmitted to the controller 17.

In the lens system of this lens apparatus 12, in order from the object side (the left side in the figure), the reference numeral 4 denotes a front focusing lens unit driven in the MF mode, the reference numeral 5 denotes a magnification-varying lens unit, and the reference numeral 6 denotes a rear focusing lens unit driven in the AF mode and AF sub-mode.

The reference numeral 7 denotes a MF operating member as a first operating member, and the reference numeral 8 denotes an actuator for driving the rear focusing lens unit 6.

The lens apparatus 12 is mounted on a camera 20. The camera 20 is an apparatus which includes at least an image-pickup device 21 such as a CCD sensor or CMOS sensor, etc., and the lens apparatus 12 and the camera 20 constitute an image-taking system.

A luminous flux from the object, which is transmitted through the lens system, enters the camera 20. In the camera 20, the luminous flux is color-separated by a color separating optical system, not shown in the figure, and then forms an image on the image-pickup device 21. The image-pickup device 21 electrically converts the object image into video signals or television signals.

The reference numeral 13 denotes a second operating member and the reference numerals 16 and 15 denote a first connecting mechanism and a second connecting mechanism. The first connecting mechanism 16 connects the actuator 8 with the rear focusing lens units 6, and the second connecting mechanism 15 connects the second operating member 13 with the rear focusing lens units 6. In this embodiment, an electromagnetic clutch is used as each connecting mechanism, but any other connecting mechanisms can be used.

As for the focus mode, three focus modes, which are the MF mode, the AF mode and the AF assist mode can be selected as well as Embodiment 1.

Next, the processes of the lens apparatus in each mode will be explained by using FIG. 3.

First, the controller 3 judges whether the mode selection switch 2 is set to the AF assist mode or not (S101) If the mode selection switch 2 is set to the MF mode or the AF mode, the process progresses to S102.

In the MF mode that is the first mode, as well as Embodiment 1, the front focusing lens unit 4 is driven in the direction of the optical axis in accordance with the operation of the MF operating member 7 by the user in a state in which the rear focusing lens unit 6 is fixed at its certain reference position.

In the AF mode, as well as Embodiment 1, the front focusing lens unit 4 is fixed at its certain reference position, and the controller 17 calculates the target position of the rear focusing lens unit 6, where the best focus will be obtained, based on the position information of the front focusing lens unit 4 and the video signal from the camera 20, and then the controller 17 sends a drive command signal to the actuator 8 so that the rear focusing lens unit 6 is moved to the target position.

At that time, the controller 17 sends a command signal to each connecting mechanism so that the second connecting mechanism 15 is set to OFF (unconnected) state and the first connecting mechanism 16 is set to ON (connected) state. This state corresponds to a first state of the connecting mechanisms 15 and 16. As a result, the driving power of the actuator 8 is transmitted to the rear focusing lens unit 6, and thereby the AF operation becomes possible.

If the mode selection switch 2 is set to the AF assist mode (S101), the process progresses to S103. In the AF sub-mode of the AF assist mode, as well as the AF mode, the second connecting mechanism 15 is set to OFF (unconnected) state and the first connecting mechanism 16 is set to ON (connected) state, and the AF operation is performed by driving the rear focusing lens unit 6 in the direction of the optical axis with the actuator 8.

And, if the user operates the second operating member 13 during the AF operation in the AF sub-mode, a detector 14 detects the operation (operation amount and direction), and the detection signal is sent to the controller 17 (S104).

According to the detection signal, the controller 17 sends command signals to the connecting mechanisms 15 and 16 so that the second connecting mechanism 15 is set to ON state and the first connecting mechanism 16 is set to OFF state (SlO5). This state corresponds to a second state of the connecting mechanisms 15 and 16, and thus the focus mode is switched from the AF sub-mode to the MF sub-mode.

As a result, since the second operating member 13 is mechanically connected with the rear focusing lens unit 6, it becomes possible that the user drives the rear focusing lens unit 6 further directly as compared with Embodiment 1.

Moreover, since the connection of the rear focusing lens unit 6 and the actuator 8 is released, it becomes possible to prevent a heavy load occurred by giving the priority to the manual operation from working on the actuator 8.

Moreover, it is desirable that the movement of the front focusing lens unit 4 is prohibited by locking the front focusing lens unit 4 with a locking mechanism, not shown in the figure, for example, in the MF sub-mode of the AF assist mode.

If the reference position of the front focusing lens unit 4 is changed by being touched by the user unintentionally, the user cannot perform the MF operation to the intended focus state (focus position). However, the prohibition of the movement of the front focusing lens unit 4 in the MF sub-mode can suppress the occurrence of that problem.

In this embodiment, the drive of the rear focusing lens unit 6 in accordance with the operation of the second operating member 13 is not performed in the MF mode (first mode). However, the drive of the rear focusing lens unit 6 in accordance with the operation of the second operating member 13 may be performed in the MF mode.

Because, since both the front focusing lens unit 4 and the rear focusing lens unit 6 are lens units for focus, and the both lenses have the similar optical function, the user doesn't care which lens unit is driven for MF.

The user becomes to be able to select any one of both operating members 7 and 13 to perform the MF operation if the rear focusing lens unit 6 can be also driven by the operating member 13 in the MF mode (first mode) as described above.

According to the structure described above, the user can adjust the focus state from the outside of the lens apparatus 12 though it is during the AF operation.

And, the AF operation is restarted from the adjusted focus position at once when the controller 8 judges that the user's operation of the second operating member 13 (that is, the focus adjustment by the user) has been finished through the operation detector 14 (S106).

The detection signal showing that the operation of the second operating member 13 has been finished is sent to the controller 17, and the controller 17 sends command signals to the connecting mechanisms 15 and 16 so that the second connecting mechanism 15 is set to OFF state and the first connecting mechanism 16 is set to ON state again. And then, the AF operation is restarted from that focus position at once by the connection of the actuator 8 and the rear focusing lens unit 6 having revived.

According to the structure of this embodiment, since the AF assist mode having the AF sub-mode and the MF sub-mode is provided in the hybrid-type lens apparatus, and the connection state with respect to the rear focusing lens unit can be accordingly switched, it becomes possible for the user to perform the MF operation at any time during the AF operation with good following performance without ruining the operation feeling, and the degree of freedom of image-taking can be widened.

Furthermore, according to each embodiment described above, since the focus mode is switched from the AF sub-mode (the second mode) to the MF sub-mode (the third mode) in accordance with the operation of the second operating member preformed in the AF sub-mode, and the rear focusing lens unit can be driven and the focus state can be changed in accordance with the operation (operation amount and direction) of the second operating member in a state in which the front focusing lens unit is fixed at an optional reference position in the MF sub-mode, it becomes possible to perform the focus adjustment more suitable for the user's intention to image-taking.

In addition, the description has been made about the lens apparatus having three focus modes of the MF mode, AF mode and the AF assist mode in each above embodiment. However, the present invention is applicable to a lens apparatus having only two focus modes of the MF mode and the AF assist mode. In this case, the operation of the second operation member always becomes effective, thereby the user can change the focus state at any time during the AF operation.

This application claims priority from Japanese Patent Application No. 2004-000604 filed Jan. 5, 2004, which is hereby incorporated by reference herein.

What is claimed is:

1. A lens apparatus comprising, in order from an object side:
    a front focusing lens unit;
    a magnification-varying lens unit; and
    a rear focusing lens unit,
    wherein the lens apparatus has the following focus modes:
        a first focus mode in which the front focusing lens unit that is mechanically connected with a first operating unit is driven in accordance with an operation of the first operating unit;
        a second focus mode in which automatic focus is performed by driving the rear focusing lens unit using an actuator; and
        a third focus mode in which the rear focusing lens unit is driven in accordance with an operation of a second operating unit that is different from the first operating unit,
    wherein an operation of the second operating unit in the second focus mode changes the focus mode from the second focus mode to the third focus mode, wherein the rear focusing lens unit is driven in accordance with an operation amount of the second operating unit in the third focus mode,
    wherein the lens apparatus comprising a connecting mechanism which is selectively set to a first state in which the actuator is connected with the rear focusing lens unit and the second operating unit is not connected with the rear focusing lens unit, and a second state in which the second operating unit is mechanically connected with the rear focusing lens unit and the actuator is not connected with the rear focusing lens unit, and
    wherein the first state is set in the second focus mode, and the second state is set in the third focus mode.

2. The lens apparatus according to claim 1, further comprising a controller which controls a switching operation of the connecting mechanism from the first state to the second state in accordance with switching from the second focus mode to the third focus mode.

* * * * *